United States Patent

Sigler et al.

(10) Patent No.: US 7,841,509 B2
(45) Date of Patent: Nov. 30, 2010

(54) METHOD OF BRAZING WITH TWO DIFFERENT BRAZE COMPOSITIONS

(75) Inventors: David R. Sigler, Shelby Township, MI (US); Anil K. Sachdev, Rochester Hills, MI (US); James G. Schroth, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 275 days.

(21) Appl. No.: 11/876,883

(22) Filed: Oct. 23, 2007

(65) Prior Publication Data

US 2009/0102588 A1    Apr. 23, 2009

(51) Int. Cl.
B23K 31/02 (2006.01)
B23K 20/22 (2006.01)
B21D 39/00 (2006.01)

(52) U.S. Cl. ............... 228/225; 228/164; 228/262.61

(58) Field of Classification Search ............. 228/141.1, 228/164–174, 262.6–262.61, 225, 226; 285/148.12, 285/148.9; 138/142, 109; 244/119, 120, 244/123.1, 123.13, 123.14, 123.2–123.4
See application file for complete search history.

(56) References Cited

U.S. PATENT DOCUMENTS

| 1,947,471 | A | * | 2/1934 | Holloway | 228/23 |
| 2,137,097 | A | * | 11/1938 | Sateren | 285/148.12 |
| 2,987,813 | A | * | 6/1961 | Pope et al. | 228/170 |
| 3,528,688 | A | * | 9/1970 | Stenerson | 285/288.1 |
| 3,534,986 | A | * | 10/1970 | Menne et al. | 285/55 |
| 3,750,248 | A | * | 8/1973 | Morris | 228/154 |
| 3,760,481 | A | * | 9/1973 | Greever | 29/890.043 |
| 3,963,162 | A | * | 6/1976 | Taguchi et al. | 228/134 |
| 4,073,427 | A | * | 2/1978 | Keifert et al. | 228/165 |
| 4,415,187 | A | * | 11/1983 | Hudson, Jr. | 285/148.12 |
| 4,510,171 | A | * | 4/1985 | Siebert | 427/455 |
| 4,887,853 | A | * | 12/1989 | Flowers et al. | 285/288.1 |
| 5,137,202 | A | * | 8/1992 | Purdy, III | 228/132 |
| 5,265,790 | A | * | 11/1993 | Mumford et al. | 228/189 |
| 5,333,918 | A | * | 8/1994 | Crout et al. | 285/288.1 |
| 5,400,951 | A | * | 3/1995 | Shiroyama et al. | 228/168 |
| 5,439,257 | A | * | 8/1995 | Williamson | 285/288.1 |
| 5,529,639 | A | * | 6/1996 | Sato et al. | 148/26 |
| 5,898,211 | A | * | 4/1999 | Marshall et al. | 257/601 |
| 6,502,400 | B1 | * | 1/2003 | Freidauer et al. | 60/772 |
| 6,800,150 | B2 | * | 10/2004 | Totino et al. | 148/528 |
| 6,821,032 | B2 | * | 11/2004 | Lake et al. | 385/94 |

(Continued)

OTHER PUBLICATIONS

D.R. Sigler et al., Sulfide-Induced Corrosion of Copper-Silver . . . ; Welding Research; vol. 86; pp. 304-s-348-s.

(Continued)

*Primary Examiner*—Jessica L Ward
*Assistant Examiner*—Carlos Gamino
(74) *Attorney, Agent, or Firm*—Reising Ethington P.C.

(57) ABSTRACT

A copper tube with copper end pieces for a water-cooled secondary winding of a welding transformer is an example of a brazed assembly having a potentially corrodible side, the water-cooled side, and a low-exposure side, the air side or dry side, of the joined pieces. By shaping contacting surfaces of the parts at the brazed joint it is useful to form a barrier, for example, between a special braze material required for the corrosive side and a conventional, easy to apply, braze material for use on the air side of the joint.

6 Claims, 2 Drawing Sheets

U.S. PATENT DOCUMENTS

| | | | |
|---|---|---|---|
| 7,021,670 B2 * | 4/2006 | Takasaki et al. | 285/124.1 |
| 7,111,519 B2 * | 9/2006 | Dille | 73/861.355 |
| 7,129,603 B2 * | 10/2006 | Kim et al. | 310/54 |
| 7,347,355 B2 * | 3/2008 | Sato et al. | 228/220 |
| 7,543,733 B2 * | 6/2009 | Wastiaux et al. | 228/128 |

OTHER PUBLICATIONS

D.R. Sigler et al., Copper-Silver-Phosphorus Braze Joint . . . ; Intern'l. Brazing and Soldering Conference, Apr. 24-26, 2006, San Antonio, TX; pp. 348-355.

* cited by examiner

METHOD OF BRAZING WITH TWO DIFFERENT BRAZE COMPOSITIONS

TECHNICAL FIELD

This disclosure pertains to the design of abutting surfaces between metal components for brazing. More specifically, this disclosure pertains to the design of joints in articles having a joint surface requiring a braze alloy providing special chemical or other properties in addition to the strength requirements of the brazed joint.

BACKGROUND OF THE INVENTION

Many articles of manufacture contain one or more brazed joints. In many instances the braze alloy simply has to be metallurgically compatible with the metal members being joined and provide requisite mechanical strength. But in some applications a brazed joint requires additional properties such as resistance to environmental corrosion. This additional requirement may add dramatically to the cost of the braze material and the finished product. An example of such a brazing application is found in water-cooled brazed copper assemblies such as resistance welding transformers.

Electrical resistance welding is widely used in the manufacture of automotive vehicle bodies and other articles of manufacture. Such welding operations require electrical transformers to provide electrical currents of 5,000 to 50,000 amperes at a voltage suitable for driving the current through welding tools and the workpiece(s). Several thousand spot welds are formed on each car body and a manufacturing plant may have a thousand weld transformers. The secondary windings of welding transformers carry large currents and are formed of single-turn or double-turn, thick-walled copper tubes with copper pads (castings) brazed to each end of the tube. The wrought tubes and cast pads are typically made from high conductivity electronic grade copper. The end pads have openings for flow of cooling water at 50 psi in the tubular windings and may further provide for electrical connections for delivery of current from the transformer winding. The secondary winding may be embedded in non-conductive epoxy resin.

The tubes and pads are joined during assembly with a torch brazing process and filler metals from the copper-silver-phosphorus braze metal family. These alloys have been used extensively in welding transformers. They are economical and can be self-fluxing when used to braze copper. The copper phosphide family of braze metals are also used for joining copper and high-copper alloys in other applications, particularly copper-to-copper tube including copper piping in cooling systems.

Although similar brazed transformers have enjoyed an excellent reputation for durability, the occurrence of failed transformers from water leaks has been observed often enough to warrant investigation. Examinations of failed joints revealed preferential attack of copper in and adjacent to Cu—Ag—P braze filler metals. Evidence indicated that the corrosion was initiated by the presence of sulfide-containing ions in the cooling water which act aggressively on copper phosphide in the braze region to corrode the joint by galvanic action.

A proposed corrective action is to use a phosphorus-free, silver-copper-zinc-tin braze filler metal. The high silver content and lack of phosphorus of this braze filler metal makes it less susceptible to corrosion from contact with water but much more expensive than the $Cu_3P$-containing conventional braze filler. Other solutions to brazing applications involving corrosion-threatened surfaces are needed.

SUMMARY OF THE INVENTION

When an article of manufacture is to include a brazed connection between two or more parts, the requirements of the brazed joint are analyzed to determine the necessary properties of the braze alloy material. If a common, low cost braze alloy may satisfy the requirements of the brazed region, it is used without further steps under this disclosure. But where a portion of the joint may require a property of a relatively expensive braze composition, a bifurcated joint structure may be designed to use a major portion of a conventional braze material in an isolated part of the joint and a small portion of a more expensive braze alloy in an exposed joint region.

An embodiment of the invention will be illustrated in the design and forming of a braze joint between a tube end and an abutting end piece(s) such as in the above described secondary winding for a welding transformer. In this embodiment, the tube and end piece are both composed of unalloyed copper which do not, in themselves, expose the assembly to galvanic corrosion. The inside of the tube is exposed to water or another potentially corrosive agent, and the outside of the brazed tubular joint is exposed to air, a medium which has not caused corrosion of the braze interface. In accordance with an embodiment of the invention the contacting surfaces of the structural members in the braze region (e.g., at or near the braze interface) are shaped to utilize a minimal portion of water-corrosion resistant braze filler metal on the water side of the joint and a major portion of braze filler metal, selected for physical properties and ease of application, on the air-side of the brazed assembly. Abutting or engaging surfaces of the tube end and end piece are shaped to form a barrier that isolates the relatively small portion of corrosion resistant braze material from the other braze material used on the dry side of the joint.

In one embodiment of the invention the end surface of the tube is provided with a curb shape, a chamfer shape, wedge shape, or other barrier-producing shape(s) that engages a facing surface of the end piece to form a physical barrier between first and second braze layers. The braze material is placed between closely spaced tube and end piece surfaces on both sides of the barrier contact. In a preferred embodiment the barrier contact is at the air side of the tube. A comparatively small portion of the corrosion resistant, first braze material is applied at the tube end on the water side of the barrier. A comparatively large portion of second braze material is applied in a layer or layers on the air side of the barrier.

Generally speaking, the invention is applicable to the design of braze joints in brazed assemblies having a first surface requiring a first braze material having corrosion-resisting or other special properties such as low vapor pressure, and a second surface that may use a braze material of a composition selected for a second property such as the required physical strength of the brazed joint or for ease of application of the braze material to the joint. The braze joint is designed to provide a physical barrier by contacting surfaces of the joined parts that isolates the first braze material from the second braze material in the formed joint. Depending upon their application temperatures, the braze materials may be applied simultaneously or sequentially in making the two-part brazed joint.

Other objects and advantages of the invention will be apparent from descriptions of preferred embodiments of the invention which follow. Reference will be had to drawing figures described in the next section of this specification.

BRIEF DESCRIPTION OF THE DRAWINGS

FIG. 2 shows the region "2" of FIG. 1.

FIG. 3 shows the region "2" of FIG. 1.

FIG. 4 shows the region "2" of FIG. 1.

FIG. 5 shows the region "2" of FIG. 1.

DESCRIPTION OF PREFERRED EMBODIMENTS

Conventional brazing processes typically use a single braze metal within each joint, even when multiple joints may be sequentially brazed at similar or different temperatures with similar or different braze filler metals. One braze metal must then provide all the attributes required by the joint such as corrosion resistance, electrical conductivity, ease of application, appearance, cost, etc. In many cases, a brazed joint requires particular attributes in certain locations within the joint. For example, in a copper-based water cooling system, joints between tubes or components must 1) seal the system, 2) provide adequate corrosion resistance to the cooling fluid, 3) carry load from one tube or component to another, 4) possibly attach other components to the system that may require load carrying capability, i.e., stiffeners, and 5) meet cost and manufacturing targets. In some cases, such as copper components brazed in cooling systems, the optimum braze metal from a strength, ease of application, and cost standpoint, can have compromised durability upon exposure to unusual water conditions. To insure adequate corrosion resistance, another braze metal is substituted that compromises other characteristics such as cost and manufacturability.

Figure 1:
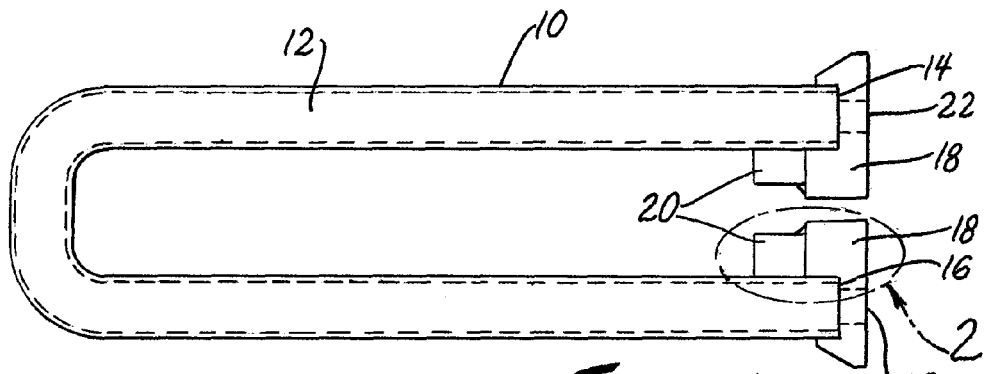
FIG. 1 is a side view of a brazed assembly comprising a single U-shaped copper tube with two ends, two copper tube-end stiffeners and two copper tube-end connector pads that constitute a secondary winding for a resistance welding electrical transformer. A braze joint structure is formed at each of the abutting surfaces of the ends of the copper tube and the connectors for placing of braze material in accordance with an embodiment of this invention.

FIG. 1 shows a side view of a U-shape, relatively thick-walled copper tube 10 which is a single turn secondary winding of a welding transformer. Tube 10 is made of relatively pure copper (suitably electronic grade). The walls of copper tube 10 are sized to carry a large electrical current for welding operations. Tube 10 has an internal passage 12 for the flow of cooling water. Brazed to each of the end portions 14, 16 of tube 10 are a connector pad 18 and an optional stiffener piece 20. The connector pads 18 and stiffener pieces 20 may also be formed of high purity copper. Each connector pad has a hole 22 for the flow of cooling water and is adapted for connection to water circulation lines, not shown in FIG. 1. Connector pads 18 may also be adapted for connection with current-carrying wires. The end portions 14, 16 of tube 10 and the contacting surfaces of connector pads 18 and stiffener pieces 20 are adapted for the placement of brazing materials to join the respective pieces of the secondary winding.

This invention provides a new braze joint design using two braze alloys separated by contacting surfaces at the braze joint.

Figure 2:
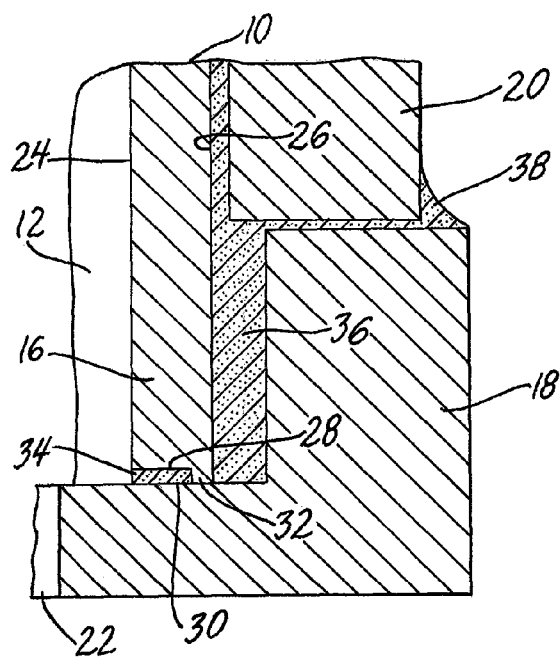
FIG. 2 is an enlarged and sectional view of a portion of one embodiment of a braze joint for the assembly of tube, stiffener, and connector pad illustrated in FIG. 1.

FIG. 2 is an enlarged sectional view of the end portion 16 of tube 10 and adjoining portions of connector pad 18 and stiffener piece 20. Internal surface 24 of tube 10 defines the internal passage 12 of the tube and is exposed to cooling water flow in the operation of the transformer. The external surface 26 of tube 10 is generally in contact with air or a potting material of the transformer assembly. Therefore, tube surface 26 is not exposed to a material that is likely to promote corrosion of the secondary winding tube 10. In accordance with this embodiment of the invention, a corrosion resistant braze material is used to braze the end surface 28 of tube 10 to the abutting surface 30 of connector pad 18. End surface 28 may be machined (relieved) to form a perimeter curb 32 that abuts surface 30 of the connector pad. The relieved portion of tube end 28 leaves a small volume for placement of a first braze alloy layer 34 between and on copper surfaces 28, 30, 32. First braze alloy layer is of a composition resistant to cooling water-induced corrosion of the braze alloy layer 34 and adjacent copper surfaces.

A layer 36 of a second braze material may be used to bond adjacent internal surfaces of stiffener 20 and connector pad 18 to the external tube surface 26 at tube end 16. As illustrated in FIG. 2 there is also a layer 38 of second braze material between abutting surfaces of stiffener 20 and connector pad 18. The second braze material (i.e., its composition) may be selected for adequate physical strength and ease of application in layers 36, 38. But, due to the isolation of second braze layers 36, 38 from the corrosive cooling water flow, the second braze material will not have to provide corresponding corrosion resistance. While the sizes of the respective braze layers 34, 36, 38 is enlarged for illustration it will be appreciated that this braze joint structure of FIG. 2 is designed to minimize the required amount of the first braze material. The geometric feature that isolates the two braze metals is curb 32 formed on the end 28 of the tube 10.

A small amount of a phosphorus-free corrosion resistant, but expensive, high-silver content braze metal may be pre-placed on the end 28 of tube 10 by either brazing the alloy to the tube end 28 or, more simply, applying a braze paste containing the high-silver alloy. Locating all the components: tube ends 14, 16 with curb 32, connector pads 18, and stiffeners 20, and reheating the assembly will allow the high-silver, phosphorus-free braze to form braze alloy layer 34 between the tube end 28, pad surface 30, and curb 32 forming a corrosion resistant seal that protects the other braze alloy layers 36, 38. The remainder of the brazing operation to form braze layers 36, 38 (isolated from braze area 34) can be performed using a second alloy that has superior strength, flow, wetting, and cost characteristics such as the copper-phosphide braze alloys.

Figure 3:
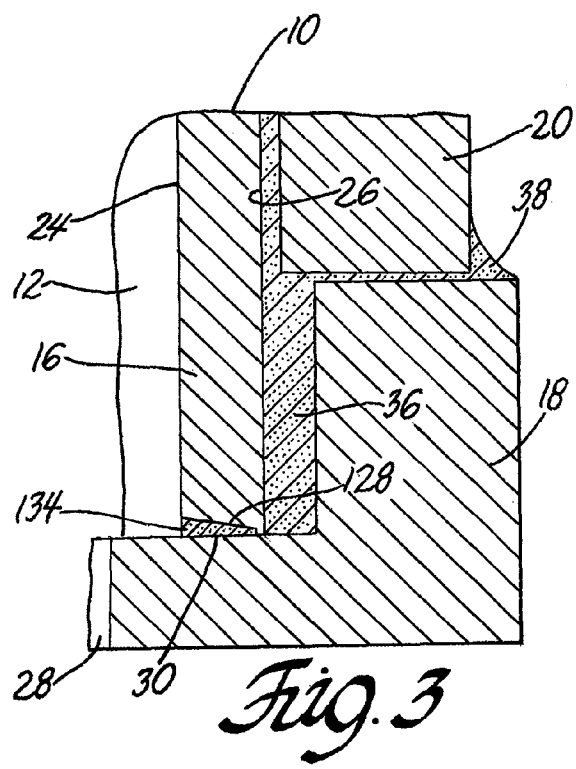
FIG. 3 is an enlarged and sectional view of a portion of a second embodiment of a braze joint for the assembly of tube, stiffener, and connector pad illustrated in FIG. 1.

FIG. 3 shows another design of a braze joint between the transformer parts. Transformer secondary winding parts that are the same as in FIG. 2 are identified with the same numerals. In this embodiment of the invention, the end surface 128 of tube end 16 is chamfered. The chamfered surface 128 provides a narrowing tapered space for first braze alloy layer 134. Chamfered tube end surface 128 isolates the second braze layers 36, 38 from the first braze alloy layer 134.

Figure 4:
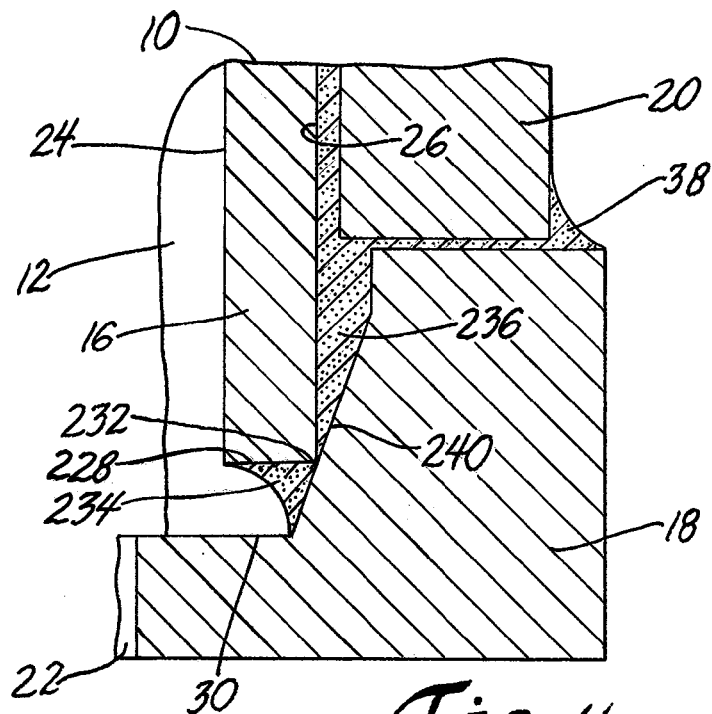
FIG. 4 is an enlarged and sectional view of a portion of a third embodiment of a braze joint for the assembly of tube, stiffener, and connector pad illustrated in FIG. 1.

FIG. 4 shows still another design of a braze joint between the transformer parts. Transformer secondary winding parts that are the same as in FIG. 2 are identified with the same numerals. In this embodiment of the invention the internal wall 240 of connector pad 18 is tapered so that the outer edge 232 of end surface 228 of tube 10 wedges against wall 240. The wedged, compressive contact between tube edge 232 and connector pad wall 240 isolates the second braze layers 236, 38 from the corrosion resistant first braze layer 234.

Figure 5:
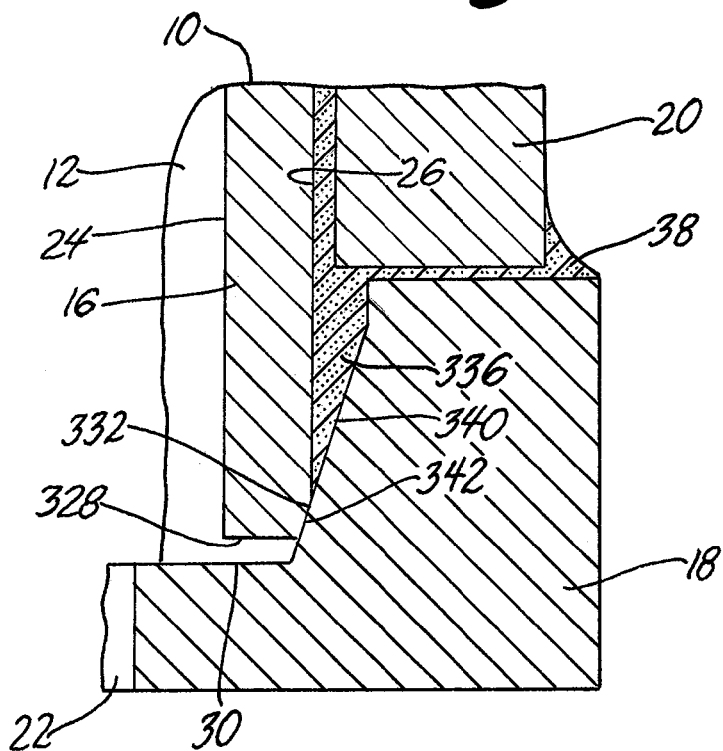
FIG. 5 is an enlarged and sectional view of a portion of a fourth embodiment of a braze joint for the assembly of tube, stiffener, and connector pad illustrated in FIG. 1.

FIG. 5 illustrates a design of a braze joint between the transformer parts that does not use two braze alloys. Transformer secondary winding parts that are the same as in other drawing figures are identified with the same numerals. In this embodiment interior wall 340 of connector pad 18 is tapered as is the exterior corner 332 of the end portion 16 of tube 10 near the end surface 328 of the tube. The facing tapered surfaces 340 and 332 are wedged together in assembly of the pieces and the plasticity of the engaged tube 10 and connector 18 forms a sealing contact in region 342. This sealing contact isolates braze layers 38 and 336. This sealing contact may also be sufficient to avoid the use of the corrosion resistant first braze alloy material.

Alternatively, other forms of isolation like soft metallic seals could be used in the region referred to as the curb 32 in FIG. 2 or chamfered surface 128 in FIG. 3.

The pre-placed braze alloy can be applied in different ways. For the examples below it could be simply torch brazed on the end of the tube after preparation of the tube end and application of the appropriate flux. Alternatively, a small amount of braze paste containing the alloy along with the appropriate flux could be applied to the end of the tube.

Practices of the invention have been described in terms of illustrative embodiments which are not limiting of the scope of the invention.

The invention claimed is:

1. A method of forming a brazed joint region between a first member and a second member of an article where the brazed joint region of the article has a first side and a second side that are to be exposed to different environmental media, the method comprising:
    shaping first side surfaces of the braze region of the members to have a first pair of facing surfaces separated by a first braze alloy gap;
    shaping second side surfaces of the braze region of the members to have a second pair of facing surfaces separated by a second braze alloy gap;
    shaping a surface of at least one of the members to contact a facing surface of the other member when they are assembled for brazing to separate the first braze alloy gap from the second braze alloy gap in the braze region;
    assembling the members to acquire the contacting surfaces and the first and second braze alloy gaps;
    introducing a first braze alloy composition into one of the first and second alloy gaps to form a first brazed joint in the gap; and
    introducing a second and different braze alloy composition into the other of the braze alloy gaps to form a second brazed joint in the other gap, the first and second brazed joints being physically isolated from each other by the contacting facing surfaces so that the respective brazed joints are exposed only to their respective different environmental medium.

2. A method of forming a brazed joint region as recited in claim 1 in which the first member is a tube with an open end that is brazed to a second member and the tube has an end surface portion that contacts a surface of the second member to separate the first braze alloy gap and the second braze alloy gap.

3. A method of forming a brazed joint region as recited in claim 1 in which the first member is a tube with an open end that is brazed to a second member that is an end-piece for the tube, the end-piece having surfaces that face both an end surface of the tube and a tube side surface, the tube having an end surface portion that contacts a facing surface of the second member to separate a first alloy gap between the end surface of the tube and a facing surface of the end-piece and a second alloy gap between the tube side surface and a facing surface of the end-piece.

4. A method of forming a brazed joint region as recited in claim 3 in which the first member is a copper tube and the second member is a copper end-piece, and the first braze alloy and the second braze alloy each comprise copper alloys in different compositions.

5. A method of forming a brazed joint region as recited in claim 4 in which one braze alloy composition comprises copper, phosphorous, and silver and the other braze alloy composition comprises a phosphorus-free composition with more silver than the second braze alloy composition.

6. A method of forming a brazed joint region as recited in claim 3 in which the first member is a copper tube and the second member is a copper end-piece, and one braze alloy composition comprises copper, phosphorous, and silver and the other braze alloy composition comprises a phosphorus-free composition with more silver than the second braze alloy composition.

* * * * *